(12) United States Patent
Kilmartin et al.

(10) Patent No.: US 11,386,374 B2
(45) Date of Patent: Jul. 12, 2022

(54) ANALYTICS TOOLKIT SYSTEM

(71) Applicant: Accenture Global Solutions Limited, Dublin (IE)

(72) Inventors: William Kilmartin, Wakefield, MA (US); Janette Pari Sabety, Columbus, OH (US); James L. Elder, III, Brooklyn, NY (US); Mark Hamilton Howard, Longmont, CO (US); Peter Charles Hutchinson, Minneapolis, MN (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/718,750

(22) Filed: Dec. 18, 2019

(65) Prior Publication Data

US 2020/0126018 A1    Apr. 23, 2020

Related U.S. Application Data

(62) Division of application No. 15/247,069, filed on Aug. 25, 2016, now Pat. No. 10,546,259.

(51) Int. Cl.
    G06Q 10/06 (2012.01)
(52) U.S. Cl.
    CPC ............... G06Q 10/06316 (2013.01)
(58) Field of Classification Search
    CPC ......... G06Q 10/06316; G06Q 10/0631; G06Q 30/0601; G06Q 50/20; G16H 40/40
    See application file for complete search history.

(56) References Cited

U.S. PATENT DOCUMENTS

| 6,904,449 B1 | 6/2005 | Quinones |
| 7,165,041 B1 * | 1/2007 | Guheen .............. G06Q 30/0601 705/26.1 |
| 7,596,523 B2 | 9/2009 | Sobel et al. |

(Continued)

OTHER PUBLICATIONS

Accenture, "Accenture Government Business Transformation Toolkit: Achieving Back Office Excellence," https://www.accenture.com/t20160427T013107_w_/us-en/_acnmedia/PDF-14/Accenture-Government-Transformation-Video-Transcript.pdf, Apr. 27, 2016, 2 pages.

(Continued)

*Primary Examiner* — Rutao Wu
*Assistant Examiner* — Stephen S Swartz
(74) *Attorney, Agent, or Firm* — Harrity & Harrity, LLP (57) ABSTRACT

A device may communicate with a client device to provide, via a user interface of the client device, a set of prompts regarding an entity. The device may detect one or more user interactions with the user interface associated with indicating a set of responses to the set of prompts. The device may process data identifying the set of responses to the set of prompts to generate a set of scores for a set of recommendations based on processing the data identifying the set of responses to the set of prompts. The device may determine a ranking of the set of recommendations based on the set of scores. The device may select one or the set of recommendations based on the ranking. The device may communicate with the client device to provide information associated with the set of recommendations based on selecting the set of recommendations.

20 Claims, 7 Drawing Sheets

(56) References Cited

U.S. PATENT DOCUMENTS

| | | | |
|---|---|---|---|
| 7,856,367 B2* | 12/2010 | Shafer | G06Q 10/10 |
| | | | 705/4 |
| 10,096,033 B2 | 10/2018 | Heath | |
| 2002/0116083 A1* | 8/2002 | Schulze | H01L 22/20 |
| | | | 700/108 |
| 2004/0015381 A1 | 1/2004 | Johnson et al. | |
| 2004/0167870 A1 | 8/2004 | Wakefield et al. | |
| 2005/0172269 A1 | 8/2005 | Johnson et al. | |
| 2005/0210336 A1* | 9/2005 | Russell | G06Q 30/0201 |
| | | | 714/37 |
| 2006/0004596 A1* | 1/2006 | Caniglia | G06Q 10/06 |
| | | | 705/7.11 |
| 2006/0015393 A1* | 1/2006 | Eisma | G06Q 10/063112 |
| | | | 705/7.14 |
| 2006/0031115 A1* | 2/2006 | Eisma | G06Q 10/063112 |
| | | | 705/7.14 |
| 2006/0112123 A1 | 5/2006 | Clark et al. | |
| 2010/0324952 A1* | 12/2010 | Bastos | G06Q 10/0635 |
| | | | 705/7.28 |
| 2012/0203598 A1* | 8/2012 | Patterson | G06Q 10/0639 |
| | | | 705/7.42 |
| 2013/0097709 A1* | 4/2013 | Basavapatna | H04L 63/1416 |
| | | | 726/25 |
| 2013/0166346 A1* | 6/2013 | Al-Zuhair | G06Q 10/0635 |
| | | | 705/7.28 |
| 2014/0075004 A1 | 3/2014 | Van Dusen et al. | |
| 2014/0101636 A1 | 4/2014 | Correll et al. | |
| 2014/0188574 A1* | 7/2014 | Luca | G06Q 50/20 |
| | | | 705/7.39 |
| 2015/0081396 A1* | 3/2015 | Miller | G06F 16/21 |
| | | | 705/7.36 |
| 2015/0193708 A1 | 7/2015 | Reddington et al. | |
| 2015/0269244 A1* | 9/2015 | Qamar | G06Q 10/06398 |
| | | | 705/7.42 |
| 2016/0012194 A1* | 1/2016 | Prakash | G16H 40/40 |
| | | | 705/2 |
| 2016/0034260 A1 | 2/2016 | Ristock et al. | |
| 2016/0117466 A1 | 4/2016 | Singh | |
| 2016/0132953 A1 | 5/2016 | Davar et al. | |
| 2016/0171425 A1* | 6/2016 | Sanger | G06Q 10/105 |
| | | | 705/7.17 |
| 2016/0260044 A1* | 9/2016 | Sabet | G06Q 10/06398 |
| 2016/0283905 A1* | 9/2016 | Lahti | G06F 16/9535 |
| 2017/0034023 A1 | 2/2017 | Nickolov et al. | |
| 2018/0060780 A1 | 3/2018 | Kilmartin et al. | |

OTHER PUBLICATIONS

Accenture, "Redesigning the Back Office for Government Transformation," https://www.accenture.com/us-en/insight-redesigning-back-office-government-transformation, Apr. 27, 2016, 2 pages.

* cited by examiner

ANALYTICS TOOLKIT SYSTEM

RELATED APPLICATION

This application is a divisional of U.S. patent application Ser. No. 15/247,069, filed Aug. 25, 2016, the disclosure of which is incorporated herein by reference.

BACKGROUND

An entity may include multiple sub-entities assigned to multiple tasks for the entity. For example, an organization may include a management unit (e.g., a human capital management unit), a finance unit, a contracting unit (e.g., a procurement unit), a technology unit, or the like. The entity may utilize multiple tools from multiple vendors to analyze each of the sub-entities. For example, the organization may utilize a first tool to determine a performance of the finance unit, and may utilize a second tool to determine a performance of the contracting unit. However, utilizing separate tools to analyze different portions of the entity may result in identifying solutions that focus on a change to a single portion of the entity at a time and fail to account for the influence of a first unit on performance of a second unit.

SUMMARY

According to some possible implementations, a device may include one or more processors. The one or more processors may communicate with a client device to provide, via a user interface of the client device, a set of prompts regarding an entity. A first set of prompts, of the set of prompts, may be associated with a first assessment tool of an analytics toolkit and relating to a first sub-entity of the entity. A second set of prompts, of the set of prompts, may be associated with a second assessment tool of the analytics toolkit and relating to a second sub-entity of the entity. The one or more processors may detect one or more user interactions with the user interface associated with indicating a set of responses to the set of prompts. The one or more processors may process data identifying the set of responses to the set of prompts to generate a set of scores for a set of recommendations based on processing the data identifying the set of responses to the set of prompts. The one or more processors may determine a ranking of the set of recommendations based on the set of scores. The one or more processors may select one or the set of recommendations based on the ranking. The one or more processors may communicate with the client device to provide, via the user interface of the client device, information associated with the set of recommendations based on selecting the set of recommendations.

According to some possible implementations, a non-transitory computer-readable medium may store one or more instructions that, when executed by one or more processors, may cause the one or more processors to provide access to a set of assessment tools of an analytics toolkit. The set of assessment tools may include an organizational process assessment tool to analyze one or more processes of an organization. The set of assessment tools may include an organizational strategy assessment tool to analyze one or more strategies of the organization. The set of assessment tools may include an organizational readiness assessment tool to analyze event readiness of the organization. The set of assessment tools may include a best practices assessment tool to analyze a set of practices implemented by the organization. The set of assessment tools may include a value targeting assessment tool to analyze a value of an improvement to a unit of a set of units of the organization. The set of assessment tools may include an analytics use cases assessment tool to analyze a set of use cases associated with the one or more processes of the organization. The one or more instructions, when executed by one or more processors, may cause the one or more processors to detect a trigger to operate the set of assessment tools based on providing access to the set of assessment tools. The one or more instructions, when executed by one or more processors, may cause the one or more processors to operate the set of assessment tools to analyze the organization and identify a recommendation relating to the organization. The one or more instructions, when executed by one or more processors, may cause the one or more processors to provide information identifying the recommendation based on operating the set of assessment tools.

According to some possible implementations, a method may include providing, by a device, information identifying a set of assessment tools. The method may include receiving, by the device, a request to perform an assessment using the set of assessment tools. The request may include information identifying a set of assessment tools, of the set of assessment tools, to perform the assessment. The method may include obtaining, by the device, information relating to an organization. The information may include results of a set of questionnaires relating to practices of the organization. The method may include determining, by the device, a set of response actions relating to the organization based on using the set of assessment tools to analyze the information relating to the organization. The method may include transmitting, by the device, information to cause the set of response actions to be implemented.

DETAILED DESCRIPTION

The following detailed description of example implementations refers to the accompanying drawings. The same reference numbers in different drawings may identify the same or similar elements.

An entity, such as a private organization, a governmental organization, or the like, may include multiple sub-entities. For example, the entity may include a first group of employees associated with performing management tasks, a second group of employees associated with performing finance tasks, a third group of employees associated with performing human resources tasks, a fourth group of employees associated with performing contracting tasks, or the like. The entity may utilize an assessment tool to analyze a particular sub-entity. For example, a governmental organization may perform an assessment of contracting procedures at the governmental organization, and may identify an improvement to the contracting procedures. Similarly, the governmental organization may perform an assessment of human resources procedures at the governmental organization, and may identify an improvement to the human resources procedures.

However, analyzing a single sub-entity of an entity may result in identifying a solution to a problem with the single sub-entity that fails to account for the influence of other sub-entities in procedures of the single sub-entity. For example, a deficiency in contracting procedures may relate to, and may be best solved by a solution relating to, hiring procedures. Similarly, a problem that appears, based on an assessment of management procedures, to be a management problem, may actually relate to a technology deficiency of the entity. Moreover, acquiring multiple, separate assessment tools to assess the entity may result in excess cost, lack of interoperability, and excess utilization of processing resources based on identifying solutions that are poorly tailored to the entity, and being required to re-utilize the multiple, separate assessment tools multiple times.

Implementations, described herein, may provide a package of multiple assessment tools via an analytics toolkit system for administrative functions to assess an entity, thereby permitting cross-unit (e.g., cross sub-entity) response actions to be identified for the entity and implemented. In this way, the analytics toolkit system provides information associated with an end-to-end assessment of an organization in an end-to-end user interface, thereby reducing computing resources relative to requiring a user to navigate multiple user interfaces associated with multiple assessment tools. Moreover, based on packaging multiple assessment tools into a single toolkit, the analytics toolkit system reduces a utilization of network traffic relative to a user being required to locate and obtain each assessment tool separately. Furthermore, a function that is to be performed by multiple tools, such as a data analysis function or a data collection function, may be integrated and performed as a single function rather than multiple, separate functions, thereby reducing a utilization of processor resources. Moreover, a more accurate assessment is determined than if multiple, separate assessments were performed.

Figure 1A:
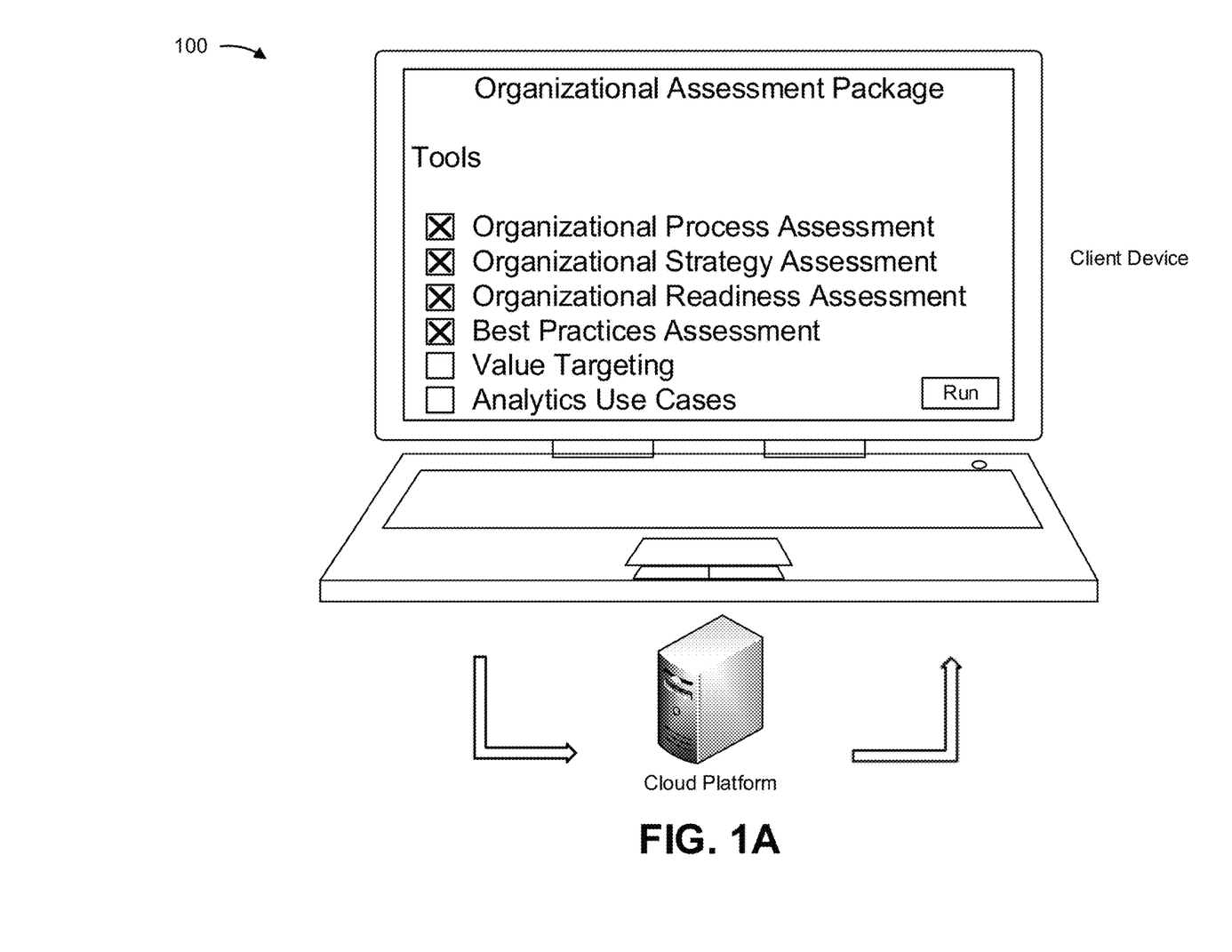
FIGS. 1A and 1B are diagrams of an overview of an example implementation described herein.
Figure 1B:
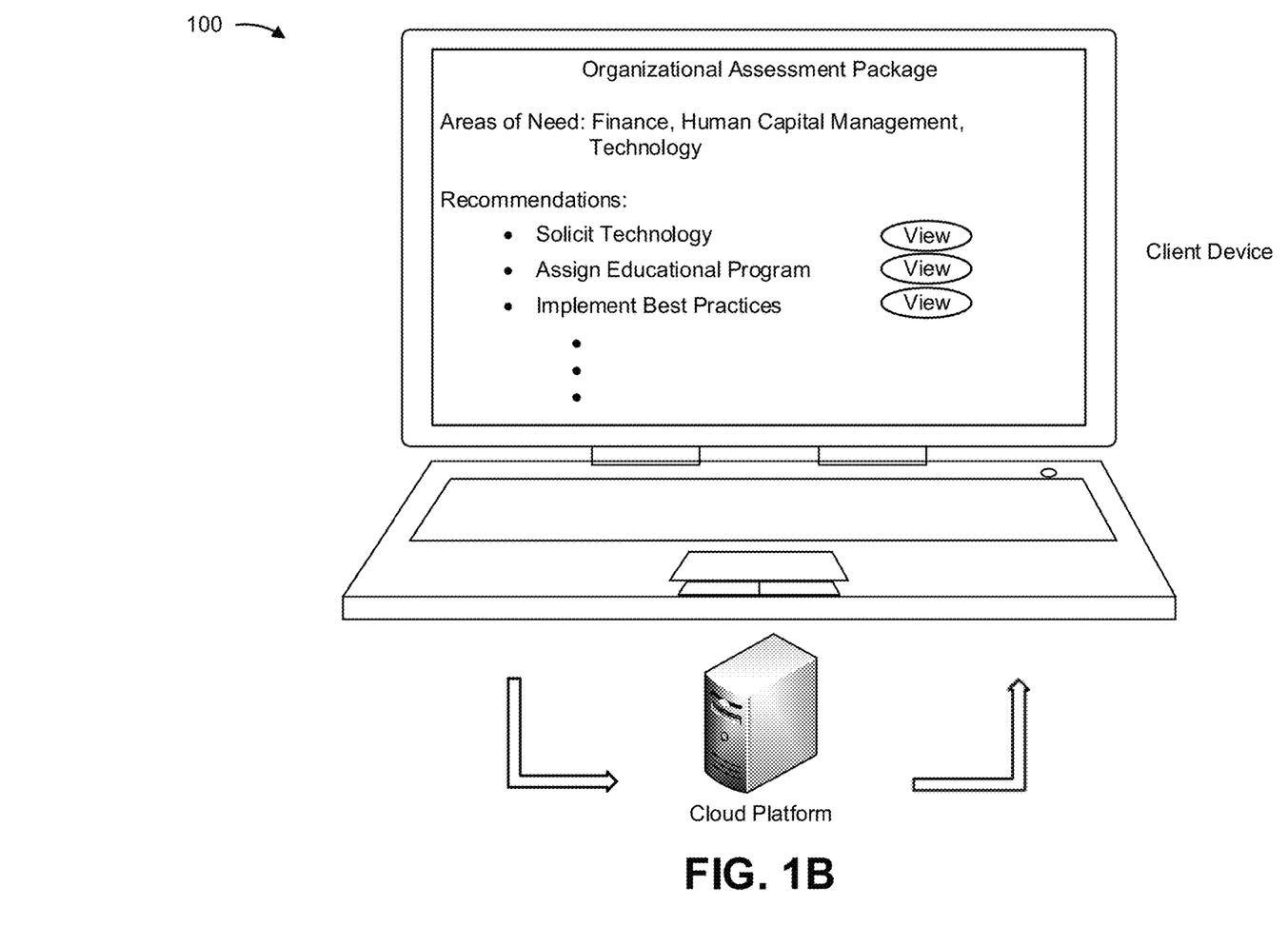

FIGS. 1A and 1B are diagrams of an overview of an example implementation 100 described herein. As shown in FIG. 1A, example implementation 100 may include a client device and a cloud platform.

As further shown in FIG. 1A, the cloud platform causes the client device to provide a user interface for utilizing an analytics toolkit system (e.g., an Organizational Assessment Package). The analytics toolkit system may include a package of multiple assessment tools to assess multiple units of an organization in an end-to-end manner, rather than as individual, separate units, and to provide results via an end-to-end user interface, rather than via multiple, disparate user interfaces. The analytics toolkit system may include an organizational process assessment tool, an organizational strategy assessment tool, an organizational readiness assessment tool, a best practices assessment tool, a value targeting assessment tool, an analytics use cases assessment tool, or the like.

As further shown in FIG. 1A, based on detecting user input with a user interface, the client device may select a set of assessment tools, of the package of multiple assessment tools, to be utilized to assess an organization. In another example, the cloud platform may automatically select which assessment tools to utilize, based on a type of organization being assessed, based on a type of user for whom the assessment is being performed (e.g., a financial manager, a human resources manager, a procurement manager, or a technology manager), based on information relating to the organization (e.g., based on performing an initial assessment to trigger one or more subsequent assessments using one or more other assessment tools), based on a payment (e.g., to an assessment company indicating an assessment that is to be performed), or the like. In another example, the cloud platform may provide a recommendation to a user of a set of assessment tools to utilize, and may receive a confirmation to utilize the set of assessment tools based on detecting a user interaction with a user interface of the client device. The client device may provide information identifying the set of assessment tools to the cloud platform, which may analyze the organization utilizing the set of assessment tools. The cloud platform may utilize an analytics engine to process organizational information, results of a set of questionnaires, or the like. The cloud platform may utilize a machine learning technique, such as a neural network technique, a heuristic technique, or the like to process the organizational information. For example, the cloud platform may identify one or more other organizations similar to the organization based on stored information or obtained information (e.g., from the Internet) regarding the one or more other organizations, may assess the organization relative to the one or more other organizations, and may provide a recommendation of a set of best practices to be implemented in the organization based on assessing the organization relative to the one or more other organizations.

As shown in FIG. 1B, the cloud platform may cause the client device to provide another user interface identifying results of assessing the organization based on processing the organizational information. For example, the client device may identify a set of areas of need for the organization, such as a set of units of the organization for which a set of processes fail to satisfy a threshold score relative to a set of best practices for the processes. Additionally, or alternatively, the client device may identify a set of recommendations to improve the set of areas of need, such as a recommendation to solicit bids for a technology improvement for the organization, a recommendation to assign a training program to a group of managers at the organization, a set of best practices that are to be implemented to replace a set of processes of the organization, or the like.

In some implementations, the cloud platform may automatically perform a set of response actions based on assessing the organization. For example, the cloud platform may utilize a natural language processing technique to generate a request for proposal, and may post the request for proposal to a solicitation website to solicit bids for the technology improvement. Similarly, the cloud platform may automatically provide a set of alerts to a set of client devices used by a set of managers regarding a best practices training program, and may cause the best practices training program to be provided for display via the set of client devices utilized by the set of managers. Similarly, the cloud platform may utilize stored information regarding the set of best practices to automatically generate a customized presentation identifying the set of best practices, and provide the presentation for display via the set of client devices.

In this way, the cloud platform may provide an end-to-end assessment solution for organizations, thereby obviating a need to utilize multiple different assessment tools provided by multiple vendors. Moreover, based on improving an accuracy of organizational assessments relative to utilizing a single assessment tool targeting a single unit of an organization, the cloud platform permits the organization to reduce a quantity of employees and devices that are dedicated to performing assessments, thereby reducing a utilization of processing resources, memory resources, or the like. Furthermore, based on providing the analytics toolkit system rather than requiring a user to locate and obtain multiple assessment tools from multiple sources, the cloud platform reduces a utilization of network resources. Moreover, utilization of processing resources is reduced based on eliminating duplicative tasks, such as data collection, data analysis, or the like that, in another example, may be performed separately by multiple, separate assessment tools.

As indicated above, FIGS. 1A and 1B are provided merely as an example. Other examples are possible and may differ from what was described with regard to FIGS. 1A and 1B.

Figure 2:
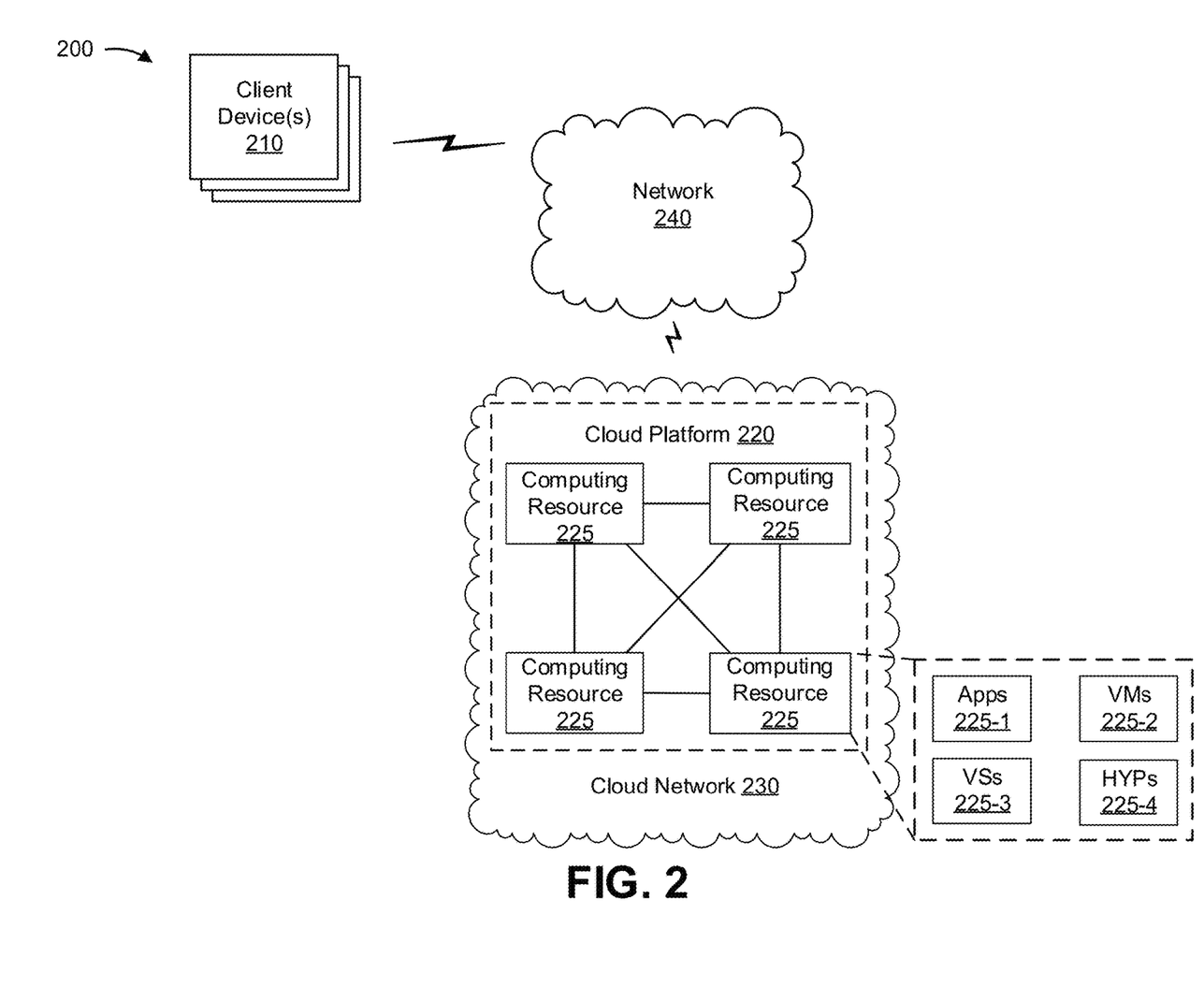
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210, a cloud platform 220, a cloud network 230, and a network 240. Devices of environment 200 may interconnect via wired connections, wireless connections, or a combination of wired and wireless connections.

Client device 210 includes one or more devices capable of receiving, generating, storing, processing, and/or providing information associated with an assessment of an organization. For example, client device 210 may include a communication and/or computing device, such as a mobile phone (e.g., a smart phone or a radiotelephone), a computer (e.g., a laptop computer, a tablet computer, a handheld computer, or a desktop computer), a wearable communication device (e.g., a smart wristwatch or a pair of smart eyeglasses), or a similar type of device. In some implementations, client device 210 may receive information from and/or transmit information to another device in environment 200 (e.g., via network 240).

Cloud platform 220 includes one or more devices capable of storing, processing, and/or routing information associated with an assessment of an organization. For example, cloud platform 220 may include a server that is associated with assigning resources of cloud network 230, directing functionalities of cloud network 230, or the like. In some implementations, cloud platform 220 may include a communication interface that allows cloud platform 220 to receive information from and/or transmit information to other devices in environment 200. While cloud platform 220 is described as a resource in a cloud computing network, such as cloud network 230, cloud platform 220 may operate external to a cloud computing network, in some implementations.

Cloud platform 220 may operate one or more computing resources 225 to provide the organizational process assessment tool to analyze one or more processes of an organization based on a set of questions. For example, cloud platform 220 may utilize the organizational process assessment tool (e.g., a business process assessment tool) to identify a set of stakeholders of an organization (e.g., a set of managers, a set of employees, or a set of executives), automatically provide a set of questionnaires for completion by the set of stakeholders (e.g., via a set of client devices 210), analyze results of the set of questionnaires based on identified best practices for organizations identified as similar to the organization, and may provide output of an assessment of organizational processes. In this case, cloud platform 220 may provide, as output, a heat map identifying units of the organization for which the organization is associated with better than average organizational processes relative to the similar organizations, worse than average organizational processes relative to the similar organizations, or the like.

Cloud platform 220 may operate one or more computing resources 225 to provide the organizational strategy assessment tool to analyze one or more strategies of an organization based on a set of questions. For example, the organizational strategy assessment tool may provide a questionnaire for display to a set of users (e.g., via a particular client device 210) regarding strategies and case studies, and may receive a set of responses from the set of users (e.g., based on detecting a set of user interactions with the particular client device 210). In this case, cloud platform 220 may provide, as output, information identifying organizational principles for an organization based on responses from the set of users.

Cloud platform 220 may operate one or more computing resources 225 to provide the organizational readiness assessment tool to analyze technology and/or culture of an organization. For example, cloud platform 220 may utilize the organizational readiness assessment tool to provide a set of prompts for display to a set of users (e.g., via a particular client device 210), and to receive a set of responses from the set of users (e.g., based on detecting a set of user interactions with the particular client device 210). In this case, cloud platform 220 may provide, as output, information (e.g., a heat map) identifying an assessment of an organization's event readiness (e.g., readiness for an emergency event, a financial event, or a planned event) based on an assessment of technology at the organization and/or an organizational culture.

Cloud platform 220 may operate one or more computing resources 225 to provide the best practices assessment tool to identify a set of best practices trainings that are to be provided to improve best practices compliance of an organization. For example, cloud platform 220 may utilize the best practices assessment tool to analyze organizational information, determine a level of best practices being implemented by the organization relative to one or more similar organizations, and identify a set of best practices trainings to provide to a set of employees of the organization (e.g., via client device 210). In this case, cloud platform 220 may provide, as output, information identifying the set of best practices trainings, a video stream of a particular best practices training, or the like.

Cloud platform 220 may operate one or more computing resources 225 to provide the value targeting assessment tool to improve revenue and/or reduce expenses of an organization. For example, cloud platform 220 may utilize the value targeting assessment tool to analyze organizational information regarding multiple units of the organization, and to identify one or more units for which an alteration to one or more processes is determined to improve revenue or reduce expenses for the organization. In this case, cloud platform 220 may provide, as output, information identifying a quantification of the improvement to revenue and/or the reduction to expenses resulting from implementing the alteration to the one or more processes.

In some implementations, cloud platform 220 may be hosted by a cloud computing environment, such as cloud network 230 or the like. The cloud computing environment may provide computation, software, data access, storage, etc. services that do not require end-user knowledge of a physical location and configuration of system(s) and/or device(s) that host cloud platform 220. As shown, the cloud computing environment may include a group of computing resources 225 (referred to collectively as "computing resources 225" and individually as "computing resource 225").

Computing resource 225 includes one or more personal computers, workstation computers, server devices, or another type of computation and/or communication device. In some implementations, computing resource 225 may host cloud platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 includes a group of cloud resources, such as one or more applications ("APPs") 225-1, one or more virtual machines ("VMs") 225-2, one or more virtualized storages ("VSs") 225-3, or one or more hypervisors ("HYPs") 225-4.

Application 225-1 includes one or more software applications that may be provided to or accessed by one or more devices of environment 200. For example, applications 225 may include the set of assessment tools and/or a package of multiple assessment tools integrated into a single application. Application 225-1 may eliminate a need to install and execute the software applications on devices of environment 200. For example, application 225-1 may include software associated with cloud platform 220 and/or any other software capable of being provided via a cloud computing environment. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., associated with one or more devices of environment 200), and may manage infrastructure of a cloud computing environment, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 may provide hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Cloud network 230 includes an environment that delivers computing as a service, whereby shared resources, services, etc. may be provided by cloud server 220 to store, process, and/or route information associated with an assessment of an organization. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210 via one or more wired or wireless networks (e.g., network 240).

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a personal area network (PAN), a telephone network (e.g., the Public Switched Telephone Network (PSTN)), a private network, an ad hoc network, an intranet, the Internet, a fiber optic-based network, a cloud computing network, a peer-to-peer network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
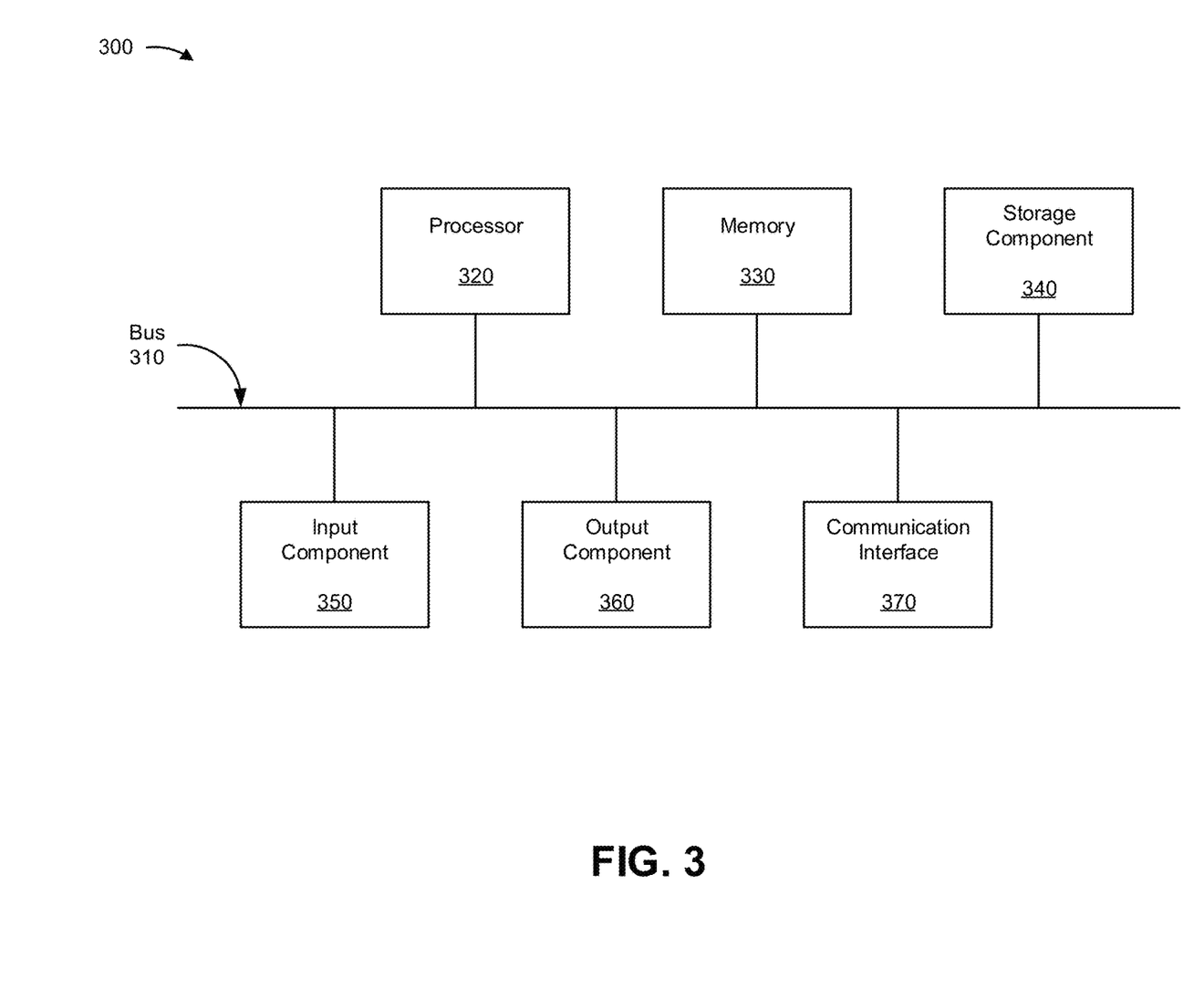
FIG. 3 is a diagram of example components of one or more devices of FIG. 2.

FIG. 3 is a diagram of example components of a device 300. Device 300 may correspond to client device 210 and/or cloud platform 220. In some implementations, client device 210 and/or cloud platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
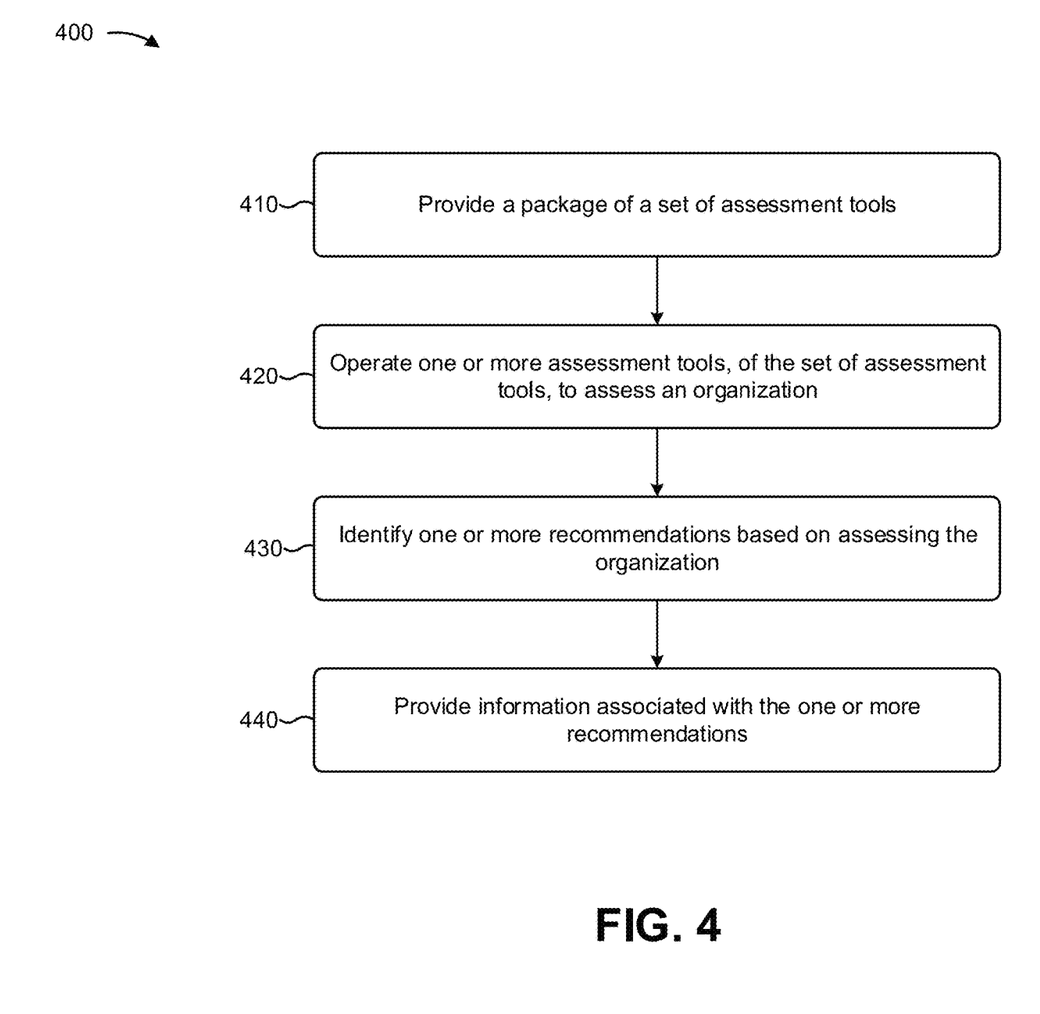
FIG. 4 is a flow chart of an example process for utilizing an analytics toolkit system to analyze an entity.

FIG. 4 is a flow chart of an example process 400 for utilizing an analytics toolkit system to analyze an entity. In some implementations, one or more process blocks of FIG. 4 may be performed by cloud platform 220. In some implementations, one or more process blocks of FIG. 4 may be performed by another device or a group of devices separate from or including cloud platform 220, such as client device 210.

As shown in FIG. 4, process 400 may include providing a package of a set of assessment tools (block 410). For example, cloud platform 220 may provide the package of the set of assessment tools (e.g., an analytics toolkit system that includes the set of assessment tools). In some implementations, cloud platform 220 may provide the package based on a request. For example, client device 210 may request access to the set of assessment tools, and cloud platform 220 may provide access to the package of the set of assessment tools based on receiving the request. In some implementations, cloud platform 220 may provide a subset of a group of assessment tools. For example, cloud platform 220 may receive a request for a particular subset of assessment tools, may package the subset of assessment tools into a single package, and may provide the single package for utilization by a user of client device 210. Additionally, or alternatively, cloud platform 220 may automatically determine a set of assessment tools that are to be provided in a package of assessment tools based on results of a previous assessment, based on payment information identifying a type of assessment that is to be performed, or the like.

The set of assessment tools may include multiple assessment tools associated with providing an assessment of an organization. For example, the set of assessment tools may include an organizational process assessment tool, an organizational strategy assessment tool, an organization readiness assessment tool, a best practices assessment tool, a value targeting assessment tool, an analytics use cases assessment tool, or the like. In some implementations, cloud platform 220 may provide access to a group of computing resources 225 associated with operating the set of assessment tools. For example, cloud platform 220 may authenticate a particular user of client device 210 based on a user name, a password, or the like, and may provide access to a set of computing resources 225 associated with operating the set of assessment tools. In some implementations, cloud platform 220 may dynamically scale one or more computing resources 225 assigned to operating the set of assessment tools. For example, when cloud platform 220 provides a package of the set of assessment tools, cloud platform 220 may allocate a particular quantity of processing resources and/or memory resources to performing analysis associated with the set of assessment tools, such as based on a quantity of assessment tools that are to be operated, a class of service being provided to a user, an amount of data that is stored regarding the organization, based on a requirement of each assessment tool, or the like.

In some implementations, cloud platform 220 may provide a user interface with which to utilize the set of assessment tools. For example, cloud platform 220 may package the set of assessment tools into a single end-to-end user interface, and may provide the single end-to-end user interface for display via client device 210 (e.g., may provide information, regarding the user interface, to permit or instruct client device 210 to provide the user interface for display). In this case, cloud platform 220 may package the set of assessment tools based on a user request. Additionally, or alternatively, cloud platform 220 may package the set of assessment tools, may store the package of the set of assessment tools, and may provide the package based on a request. In this case, cloud platform 220 may provide the package of the set of assessment tools to client device 210 to be operated via client device 210.

As further shown in FIG. 4, process 400 may include operating one or more assessment tools, of the set of assessment tools, to assess an organization (block 420). For example, cloud platform 220 may operate one or more assessment tools, of the set of assessment tools, to assess the organization. In some implementations, cloud platform 220 may operate the one or more assessment tools based on detecting a trigger. For example, cloud platform 220 may detect an interaction with a user interface associated with causing cloud platform 220 to operate one or more assessment tools of the set of assessment tools. In some implementations, cloud platform 220 may be triggered to operate a particular assessment tool, of the set of assessment tools, based on a result of operating another assessment tool of the set of assessment tools. For example, cloud platform 220 may operate a first assessment tool, such as the value targeting assessment tool to identify a particular unit of an organization for which an improvement may be identified, and may operate a second assessment tool, such as the organizational process assessment tool to identify the improvement for the particular unit of the organization, to quantify the improvement for the particular unit of the organization, or the like. As another example, the result of operating a first assessment tool may cause cloud platform 220 to determine whether to operate a second assessment tool, which assessment tool of a group of assessment tools is to be operated subsequent to operating the first assessment tool, an order of assessment tools to be operated after the first assessment tools, or the like. Additionally, or alternatively, cloud platform may determine to operate an assessment tool based on results of multiple assessment tools. For example, when a third assessment tool requires results from a first assessment tool and a second assessment tool to operate, cloud platform 220 may operate the third assessment tool based on operating and receiving results from the first assessment tool and the second assessment tool.

In some implementations, cloud platform 220 may obtain information regarding an organization to operate the one or more assessment tools. For example, cloud platform 220 may obtain information relating to finances of the organization, management of the organization, procurement by the organization, human capital management for the organization, technology utilized by the organization, or the like, and may analyze the information to analyze the organization. In this case, cloud platform 220 may access a data structure associated with the organization (e.g., a finances data structure, a technology inventory data structure, a contracting data structure, or a human resources data structure), a data structure associated with a third party (e.g., a financial services third party data structure, a news source third party data structure, a consulting third party data structure, or a data structure storing information identifying one or more business processes or best practices), or the like to obtain the information regarding the organization. In some implementations, cloud platform 220 may apply a natural language processing technique to obtain the information. For example, cloud platform 220 may utilize natural language processing to analyze a news article, a survey result, or the like to obtain quantified information regarding the organization.

In some implementations, cloud platform 220 may provide a user interface to obtain information regarding an organization to operate the one or more assessment tools. For example, cloud platform 220 may identify one or more stakeholders of the organization, such as one or more managers, one or more employees, one or more consultants, or the like, and may provide a user interface for display via one or more client devices 210 utilized by the one or more stakeholders. In this case, cloud platform 220 may detect a user interaction with the user interface associated with indicating a response to one or more prompts provided via the user interface, and may store the response to the one or more prompts for processing using the one or more assessment tools.

In some implementations, cloud platform 220 may obtain information regarding one or more other organizations to operate the one or more assessment tools. For example, cloud platform 220 may obtain information relating to finances of the one or more other organizations, management of the one or more other organizations, technology utilized by the one or more other organizations, or the like, and may analyze the information to assess the organization. In some implementations, cloud platform 220 may determine a similarity score between the organization and the one or more other organizations, such as based on information identifying, for the organization and the one or more other organizations, an industry, a size, a geographic location, a type, a ranking in a publically available list (e.g., Fortune 500), a stock price, a similarity in stock prices, an ownership structure, a leadership (e.g., common chief executive officers for two organizations), or the like. In some implementations, cloud platform 220 may utilize a benchmarking capability to assess the organization with respect to the one or more other organizations with a threshold similarity score. For example, cloud platform 220 may generate a similarity score identifying a similarity to the organization for each of a set of organizations, and may select the one or more organizations based on one or more corresponding similarity scores satisfying a threshold. In this case, cloud platform 220 may assess best practices, finances, management, or the like of the organization relative to similar organizations. In this way, cloud platform 220 identifies organizations for which information is likely to be relevant to assessing the organization, thereby obviating the need to obtain and analyze information regarding each of the set of organizations. Based on filtering the set of organizations, cloud platform 220 reduces a utilization of memory resources and/or processing resources based on reducing a quantity of data that is to be analyzed.

In some implementations, cloud platform 220 may operate the one or more assessment tools to generate an assessment score associated with a unit of the organization. For example, cloud platform 220 may process data relating to one or more organizations similar to the organization to identify a set of best practices associated with the one or more organizations, and may generate an assessment score relating to the set of best practices for the organization. Additionally, or alternatively, cloud platform 220 may identify a human resources best practices score, a technology best practices score, a consulting best practices score, or the like. In some implementations, cloud platform 220 may operate the one or more assessment tools to generate a ranking relating to other units of the organization. For example, cloud platform 220 may determine a score for each unit of the organization relating to an impact of changing a procedure of each unit of the organization, and may rank the set of units based on the score for each unit (e.g., based on stored information identifying an impact score for each procedure change, based on re-assessing the organization with the procedure change included, or the like). In this case, such as when a finance procedure change determined based on a finance assessment is determined to affect a human resources unit, cloud platform 220 may determine to operate a human resources assessment to quantify a benefit of the finance procedure change and determine whether to cause the procedure change to be implemented. Similarly, cloud platform 220 may determine to perform a technology assessment to ensure that the finance procedure change does not negatively impact a technology unit. In each case, cloud platform 220 may reuse information determined for the initial finance assessment in subsequent assessments, thereby reducing a utilization of computing resources relative to re-processing or re-obtaining the information. In this way, cloud platform 220 may prioritize resources relating to implementing one or more altered procedures based on a potential impact of the one or more altered procedures.

In some implementations, cloud platform 220 may utilize the one or more assessment tools to apply a weight to one or more factors associated with a score for an organization. For example, cloud platform 220 may identify a first weighting for a first factor and a second weighting for a second factor based on an importance of each factor in success of a unit of the organization, and may apply the first weighting to a value of the first factor and the second weighting for a value of the second factor to generate a score relating to the unit of the organization.

In some implementations, cloud platform 220 may combine a set of assessments of multiple assessment tools to determine an end-to-end analysis of the organization. For example, cloud platform 220 may determine a combined score based on organizational processes, organizational strategy, organizational readiness, organizational adoption of best practices, or the like, to rate an organization. In this way, cloud platform 220 may provide a high level identification of a state of the organization.

In some implementations, cloud platform 220 may operate the one or more assessment tools to determine a cost-benefit analysis associated with one or more alterations to the organization. For example, cloud platform 220 may determine a financial impact of altering a human resources strategy, a management strategy, a technology strategy, or the like. In this way, cloud platform 220 may determine whether a particular alteration results in a financial benefit to the organization.

In some implementations, cloud platform 220 may identify a set of response actions based on operating the one or more assessment tools. For example, cloud platform 220 may identify a set of best practices that are to be implemented based on an analysis of best practices of similar organizations and an analysis of a cost-benefit of implementing the set of best practices. Similarly, cloud platform 220 may identify a hiring strategy, a technology investment strategy, an alteration to a set of business processes, or the like to improve the organization.

In some implementations, cloud platform 220 may utilize the one or more assessment tools to generate a visualization of a state of the organization. For example, cloud platform 220 may generate a heat map identifying a set of responses to a set of questionnaires relative to another set of responses associated with a set of other organizations, a set of competitor organizations, a set of industry leader organizations, or the like. In this way, cloud platform 220 may reduce a utilization of computing resources 225 associated with reviewing responses to the set of questionnaire questions, relative to provide each response, of the set of responses, in a text-based user interface.

As further shown in FIG. 4, process 400 may include identifying one or more recommendations based on assessing the organization (block 430). For example, cloud platform 220 may identify the one or more recommendations based on assessing the organization. In some implementations, cloud platform 220 may generate a set of scores for a set of recommendations based on assessing the organization, and may select a particular recommendation based on the set of scores. For example, when cloud platform 220 generates a set of scores for units of an organization, cloud platform 220 may select a particular recommendation corresponding to the particular unit (e.g., stored via a data structure storing a set of recommendations or best practices that may be applied to organizations that are assessed).

Additionally, or alternatively, when cloud platform 220 performs a cost-benefit analysis of an alteration to a process or procedure of a unit of an organization, cloud platform 220 may select a particular recommendation associated with the alteration, from a set of recommendations, based on the cost-benefit analysis for the alteration satisfying a threshold. Additionally, or alternatively, when cloud platform 220 identifies a group of response actions based on assessing the organization, cloud platform 220 may determine an order for the group of response actions based on a characteristic, such as a cost-benefit analysis, a score, or the like. In this case, cloud platform 220 may identify a recommendation for the order in which to perform the group of response actions based on the characteristic.

As further shown in FIG. 4, process 400 may include providing information associated with the one or more recommendations (block 440). For example, cloud platform 220 may provide information associated with the one or more recommendations. In some implementations, cloud platform 220 may provide a user interface (e.g., may permit client device 210 to provide the user interface, instruct client device 210 to provide the user interface, or the like) identifying a set of results of assessing an organization to provide information associated with the one or more recommendations. For example, cloud platform 220 may provide a user interface including a score for a unit of an organization, a set of best practices that are to be adopted by the unit of the organization to satisfy a recommendation, a heat map visualization of an organization's adoption of best practices for a set of units, or the like. In some implementations, cloud platform 220 may provide a cost-benefit analysis associated with a recommendation. For example, cloud platform 220 may provide, via a user interface, information identifying a cost-benefit of adopting an alteration to a process or procedure of an organization, such as causing a process or procedure of the organization to match a process or procedure of another organization determined to be associated with a set of best practices, a larger market share, or the like.

In some implementations, cloud platform 220 may provide information associated with automatically adopting one or more best practices based on the one or more recommendations. For example, when cloud platform 220 identifies a recommendation relating to hiring of staff for the organization, cloud platform 220 may automatically generate a job posting using a natural language generation tool, and may transmit the job posting to a job posting server to be listed for access by potential hires. Additionally, or alternatively, when cloud platform 220 identifies a recommendation relating to training of employees, cloud platform 220 may select a particular training program from a set of training programs (e.g., stored training programs, training programs identified based on an Internet search, or the like), may identify a set of stakeholders to whom to provide the training program, and may transmit the training program to a set of client devices 210 utilized by the set of stakeholders to cause the training program to be provided via a user interface. Similarly, cloud platform 220 may automatically reserve a room (e.g., a conference room), and transmit a set of calendar invitations to a set of calendar applications of a set of client devices 210 to set up an in-person training program.

In some implementations, cloud platform 220 may cause an audit to be automatically implemented based on a recommendation of the one or more recommendations. For example, cloud platform 220 may assign an auditor to audit a unit of an organization based on identifying a recommendation relating to auditing. Similarly, cloud platform 220 may automatically perform an audit using a computerized auditing functionality to analyze data relating to the organization, and may provide results of the audit for display. In some implementations, cloud platform 220 may automatically solicit a set of bids. For example, when cloud platform 220 identifies a recommendation relating to contracting, such as contracting for a technology upgrade or the like, cloud platform 220 may automatically fill a form for soliciting bids based on information relating to the recommendation (e.g., information identifying an item to be contracted for, a time by which the contract is to be settled, or a maximum cost that is to be associated with the contact). In this case, cloud platform 220 may cause the form to be stored on a bid solicitation server or posted to a bid solicitation website.

In some implementations, cloud platform 220 may automatically update a set of organizational guidelines for an organization based on a recommendation. For example, cloud platform 220 may identify a best practice relating to human resources, contracting, compensation, or the like, and may automatically update an employee handbook to identify the best practice using a natural language generation functionality. In this case, cloud platform 220 may transmit information identifying a set of alerts to a set of employees indicating that the employee handbook is updated.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
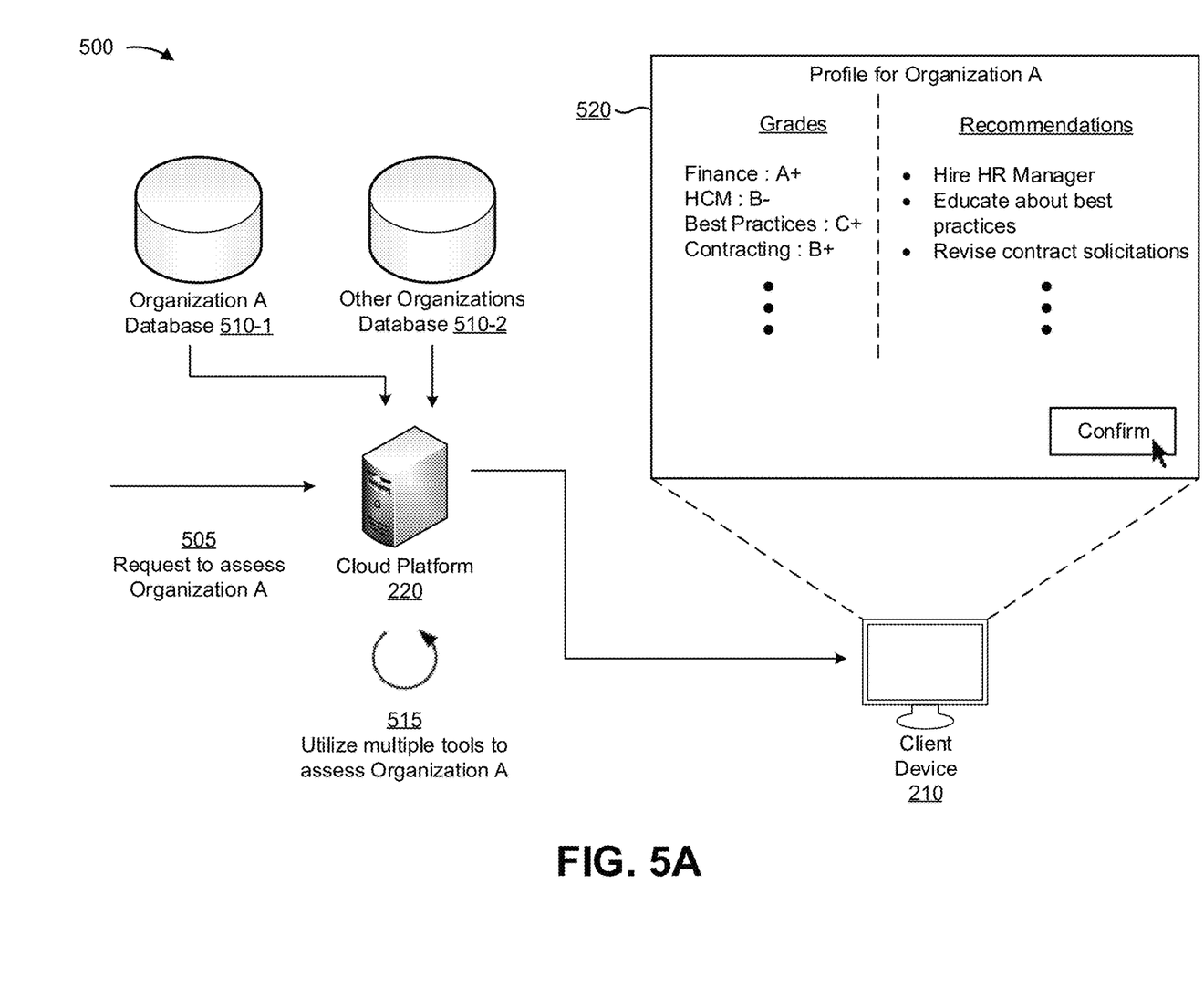
FIGS. 5A and 5B are diagrams of an example implementation relating to the example process shown in FIG. 4.
Figure 5B:
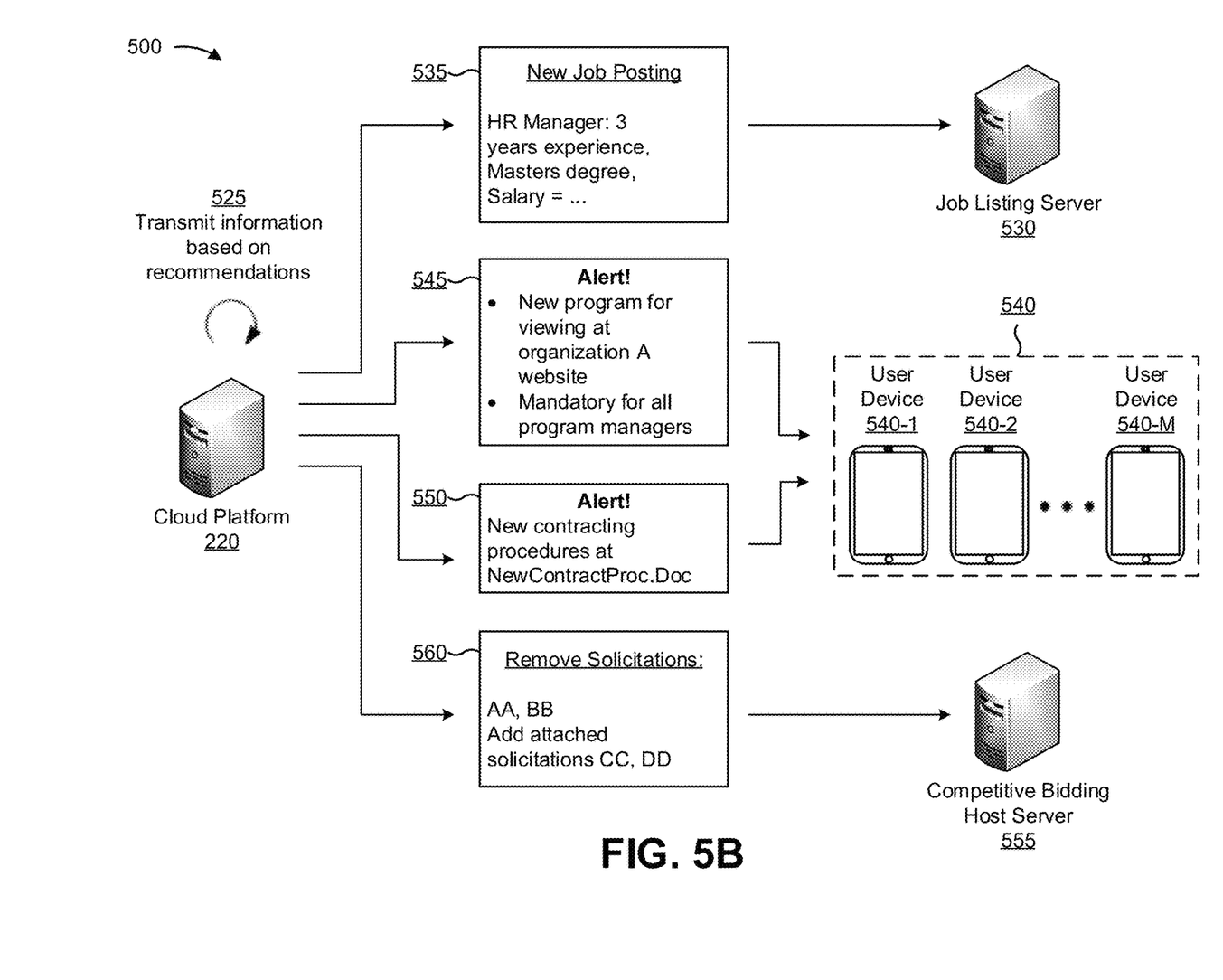

FIGS. 5A and 5B are diagrams of an example implementation 500 relating to example process 400 shown in FIG. 4. FIGS. 5A and 5B show an example of utilizing an analytics toolkit system to analyze an entity.

As shown in FIG. 5A, and by reference number 505, cloud platform 220 receives a request to assess a particular organization, Organization A. Cloud platform 220 obtains data regarding the particular organization from a set of data structures, such as a database 510-1, a database 510-2, or the like. Assume that database 510-1 stores information obtained by cloud platform 220 and relating to the particular organization, such as procedures of the particular organization, financial data for the particular organization, human resources information for the particular organization, or the like. Assume that database 510-2 stores information obtained by cloud platform 220 and relating to other organizations, such as information from one or more publically available databases, information obtained based on assessing the other organizations and storing results of the assessments, or the like.

As further shown in FIG. 5A, and by reference number 515, cloud platform 220 utilizes multiple assessment tools of an analytics toolkit system to assess the particular organization (e.g., based on an information requirement of the multiple assessment tools and an information availability for the organization). As shown by reference number 520, cloud platform 220 causes client device 210 to provide a user interface identifying a set of grades for the particular organization, such as a finance grade, a human capital management (HCM) grade (e.g., a human resources grade), a best practices grade, a contracting grade, or the like. Similarly, the user interface includes information identifying a set of recommendations generated by cloud platform 220 based on the set of grades, such as a recommendation to hire a human resources manager, a recommendation to provide training regarding a set of best practices, a recommendation to revise a set of contracting bids, or the like. Based on user interaction with the user interface, cloud platform 220 is caused to implement the set of recommendations.

As shown in FIG. 5B, and by reference number 525, cloud platform 220 transmits information based on the set of recommendations. For example, cloud platform 220 communicates with a job listing server 530 to transmit a new job posting 535 to hire a human resources manager. In this case, cloud platform 220 identifies a set of requirements for the human resources manager (e.g., an experience requirement, an education requirement, and a salary requirement) and causes the set of requirements to be included in job posting 535. As another example, cloud platform 220 communicates with a group of user devices 540-1 through 540-M utilized by a set of program managers to provide an alert 545 that a training program is accessible at a website for the particular organization. As another example, cloud platform 220 communicates with the group of user devices 540 to provide an alert 550 identifying a new contracting procedures document generated by cloud platform 220. As another example, cloud platform 220 communicates with a competitive bidding host server 555 to provide information 560 indicating that a first group of solicitations (e.g., AA and BB) are to be removed and that a new second group of solicitations (e.g., CC and DD), which were automatically generated by cloud platform 220, are to be posted to solicit bids.

As indicated above, FIGS. 5A and 5B are provided merely as an example. Other examples are possible and may differ from what was described with regard to FIGS. 5A and 5B.

In this way, cloud platform 220 automatically assesses an organization utilizing multiple assessment tools of an analytics toolkit system integrated into a single package. Based on integrating the multiple assessment tools into the single package, cloud platform 220 improves assessment of an organization, thereby increasing a likelihood of success of an alteration determined based on the assessment relative to determining an alteration based on a single assessment tool focused on a single aspect of the organization. Moreover, based on utilizing one or more first assessment tools to identify a particular unit for which an improvement may be identified and applying one or more second assessment tools to analyze the particular unit in detail, cloud platform 220 may reduce a utilization of computing resources 225 relative to applying a group of assessment tools to an all data regarding an organization. Furthermore, based on automatically performing response actions, such as posting a job posting, providing a training program, transmitting alerts, providing solicitations, or the like, cloud platform 220 may reduce a utilization of processing resources relative to a user being required to navigate multiple user interfaces to cause each response action to be implemented. Moreover, based on integrating multiple assessment tools into a common package, cloud platform 220 may reuse information or analysis determined based on operating a first assessment tool when operating a second assessment tool, thereby reducing a utilization of computing resources 225 relative to being required to re-analyze or re-obtain information to operate each assessment tool.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors of a cloud platform, to:
provide access to a plurality of assessment tools of an analytics toolkit,
the plurality of assessment tools including at least two of:
an organizational process assessment tool to analyze one or more processes of an organization,
an organizational strategy assessment tool to analyze one or more strategies of the organization,
an organizational readiness assessment tool to analyze event readiness of the organization,
a best practices assessment tool to analyze a set of practices implemented by the organization,
a value targeting assessment tool to analyze a value of an improvement to a unit of a plurality of units of the organization, or
an analytics use cases assessment tool to analyze a set of use cases associated with the one or more processes of the organization;
detect a trigger to operate a second assessment tool, of the plurality of assessment tools, based on a result of operating a first assessment tool, of the plurality of assessment tools;
operate the plurality of assessment tools to analyze the organization and identify a recommendation relating to the organization;
instruct a client device to provide a user interface; and
provide, via the user interface, information identifying the recommendation based on operating the plurality of assessment tools.

2. The device of claim 1, where the one or more processors are further to:
determine that a score for a first unit of the organization fails to satisfy a threshold based on operating the plurality of assessment tools; and
determine that an alteration to a second unit of the organization is associated with a particular improvement to the first unit,
the second unit being different from the first unit; and
where the one or more processors, when providing the information identifying the recommendation, are to:
provide information identifying the alteration to the second unit.

3. The device of claim 1, where the one or more processors are further to:
generate a visualization of the set of practices relative to a set of best practices based on operating the plurality of assessment tools; and
provide the visualization for display.

4. The device of claim 1, where the one or more processors are further to:
determine that a score for event readiness of the organization fails to satisfy a threshold based on operating the plurality of assessment tools;
identify a training program relating to organizational culture based on determining that the score for event readiness fails to satisfy the threshold; and
provide the training program for display via the user interface.

5. The device of claim 1, where the one or more processors are further to:
identify a set of organizations similar to the organization based on information relating to the set of organizations; and determine, based on operating the plurality of assessment tools, that a first assessment score for a particular process associated with the set of organizations is greater than a second assessment score for a corresponding process, associated with the organization, of the one or more processes; and where the one or more processors, when providing the information identifying the recommendation, are to:
provide information identifying the particular process based on determining that the first assessment score for the particular process is greater than the second assessment score for the corresponding process.

6. The device of claim 1, where the one or more processors are further to:
receive a selection of the plurality of assessment tools of a set of assessment tools accessible to a user; and
where the one or more processors, when operating the plurality of assessment tools, are to:
operate the plurality of assessment tools based on receiving the selection.

7. The device of claim 1, where the user interface is a single user interface.

8. A non-transitory computer-readable medium storing instructions, the instructions comprising:
one or more instructions that, when executed by one or more processors of a cloud platform, cause the one or more processors to:
provide access to a plurality of assessment tools of an analytics toolkit,
the plurality of assessment tools including at least two of:
an organizational process assessment tool to analyze one or more processes of an organization,
an organizational strategy assessment tool to analyze one or more strategies of the organization,
an organizational readiness assessment tool to analyze event readiness of the organization,
a best practices assessment tool to analyze a set of practices implemented by the organization,
a value targeting assessment tool to analyze a value of an improvement to a unit of a plurality of units of the organization, or
an analytics use cases assessment tool to analyze a set of use cases associated with the one or more processes of the organization;
detect a trigger to operate a second assessment tool, of the plurality of assessment tools, based on a result of operating a first assessment tool, of the plurality of assessment tools;
operate the plurality of assessment tools to analyze the organization and identify a recommendation relating to the organization;
instruct a client device to provide a user interface; and
provide, via the user interface, information identifying the recommendation based on operating the plurality of assessment tools.

9. The non-transitory computer-readable medium of claim 8, where the one or more instructions, when executed by the one or more processors, further cause the one or more processors to:
determine that a score for a first unit of the organization fails to satisfy a threshold based on operating the plurality of assessment tools; and
determine that an alteration to a second unit of the organization is associated with a particular improvement to the first unit,
the second unit being different from the first unit; and
where the one or more instructions that cause the one or more processors to provide the information identifying the recommendation, cause the one or more processors to:
provide information identifying the alteration to the second unit.

10. The non-transitory computer-readable medium of claim 8, where the one or more instructions, when executed by the one or more processors, cause the one or more processors to:
generate a visualization of the set of practices relative to a set of best practices based on operating the plurality of assessment tools; and
provide the visualization for display.

11. The non-transitory computer-readable medium of claim 8, where the one or more instructions, when executed by the one or more processors, further cause the one or more processors to:
determine that a score for event readiness of the organization fails to satisfy a threshold based on operating the plurality of assessment tools;
identify a training program relating to organizational culture based on determining that the score for event readiness fails to satisfy the threshold; and
provide the training program for display via the user interface.

12. The non-transitory computer-readable medium of claim 8, where the one or more instructions, when executed by the one or more processors, further cause the one or more processors to:
identify a set of organizations similar to the organization based on information relating to the set of organizations; and
determine, based on operating the plurality of assessment tools, that a first assessment score for a particular process associated with the set of organizations is greater than a second assessment score for a corresponding process, associated with the organization, of the one or more processes; and
where the one or more instructions, that cause the one or more processors to provide the information identifying the recommendation, cause the one or more processors to:
provide information identifying the particular process based on determining that the first assessment score for the particular process is greater than the second assessment score for the corresponding process.

13. The non-transitory computer-readable medium of claim 8, where the one or more instructions, when executed by the one or more processors, further cause the one or more processors to:
receive a selection of the plurality of assessment tools of a set of assessment tools accessible to a user; and
where the one or more instructions, that cause the one or more processors to operate the plurality of assessment tools, cause the one or more processors to:
operate the plurality of assessment tools based on receiving the selection.

14. The non-transitory computer-readable medium of claim 8, where the user interface is a single user interface.

15. A method, comprising:
providing, by a cloud platform, access to a plurality of assessment tools of an analytics toolkit, the plurality of assessment tools including at least two of:
- an organizational process assessment tool to analyze one or more processes of an organization,
- an organizational strategy assessment tool to analyze one or more strategies of the organization,
- an organizational readiness assessment tool to analyze event readiness of the organization,
- a best practices assessment tool to analyze a set of practices implemented by the organization,
- a value targeting assessment tool to analyze a value of an improvement to a unit of a plurality of units of the organization, or
- an analytics use cases assessment tool to analyze a set of use cases associated with the one or more processes of the organization;

detecting, by the cloud platform, a trigger to operate a second assessment tool, of the plurality of assessment tools, based on a result of operating a first assessment tool, of the plurality of assessment tools;

operating, by the cloud platform, the plurality of assessment tools to analyze the organization and identify a recommendation relating to the organization;

instructing, by the cloud platform, a client device to provide a user interface; and providing, by the cloud platform and via the user interface, information identifying the recommendation based on operating the plurality of assessment tools.

16. The method of claim 15, further comprising:
determining that a score for a first unit of the organization fails to satisfy a threshold based on operating the plurality of assessment tools; and
determining that an alteration to a second unit of the organization is associated with a particular improvement to the first unit,
the second unit being different from the first unit; and
where providing the information identifying the recommendation comprises:
providing information identifying the alteration to the second unit.

17. The method of claim 15, further comprising:
generating a visualization of the set of practices relative to a set of best practices based on operating the plurality of assessment tools; and
providing the visualization for display.

18. The method of claim 15, further comprising:
determining that a score for event readiness of the organization fails to satisfy a threshold based on operating the plurality of assessment tools;
identifying a training program relating to organizational culture based on determining that the score for event readiness fails to satisfy the threshold; and
providing the training program for display via the user interface.

19. The method of claim 15, further comprising:
identifying a set of organizations similar to the organization based on information relating to the set of organizations; and
determining, based on operating the plurality of assessment tools, that a first assessment score for a particular process associated with the set of organizations is greater than a second assessment score for a corresponding process, associated with the organization, of the one or more processes; and
where providing the information identifying the recommendation comprises:
providing information identifying the particular process based on determining that the first assessment score for the particular process is greater than the second assessment score for the corresponding process.

20. The method of claim 15, further comprising:
receiving a selection of the plurality of assessment tools of a set of assessment tools accessible to a user; and
where operating the plurality of assessment tools comprises:
operating the plurality of assessment tools based on receiving the selection.

* * * * *